Jan. 27, 1953 L. E. CHICK 2,626,760

PROTECTIVE DEVICE FOR MAGNETIC RECORDERS

Filed April 7, 1949

INVENTOR

Lloyd E. Chick

Carlson, Pitzner, Hubbard + Wolfe

ATTORNEYS

Patented Jan. 27, 1953 2,626,760

UNITED STATES PATENT OFFICE 2,626,760

PROTECTIVE DEVICE FOR MAGNETIC RECORDERS

Lloyd E. Chick, Chicago, Ill.

Application April 7, 1949, Serial No. 86,084

2 Claims. (Cl. 242—54)

The present invention relates generally to instruments known as telegraphones or magnetic recorders and more particularly to a novel protective device for use in machines of this nature.

In a telegraphone or magnetic recorder, a flexible recording medium such as a magnetizable wire or tape is commonly stored upon a pair of spaced apart reels and transferred under tension from one reel to the other. During the course of such transfer, the medium is led over a recording head which may receive a signal from the magnetizable wire or tape or, on the other hand, may impress a signal electromatically upon the wire or tape. As an incident to the operation of machines of the foregoing type, the recording medium tends to break occasionally. When this occurs, the reels and their driving means continue to rotate and the wire or tape being payed out from one of the reels usually becomes hopelessly snarled, often resulting in the loss of valuable recorded matter.

Fouling of the wire or tape can also occur in a magnetic recorder upon failure of the power supply thereto. In such event, the momentum of the rotating members persists for a short time after power failure and this is sufficient to cause objectionable snarls in the recording medium.

Accordingly, it is a general object of the present invention to provide a novel arrangement for protecting machines of the character set forth against the harmful consequences of power failure or breakage of the recording medium.

A more specific object is to provide a device of the foregoing type and which will be simple, reliable and susceptible of installation either as an integral part of a magnetic recorder or as an attachment therefor.

Other objects and advantages will become apparent as the following detailed description proceeds, taken in connection with the accompanying drawings wherein.

Figures 1, 2, 3, 4, 5, 6:
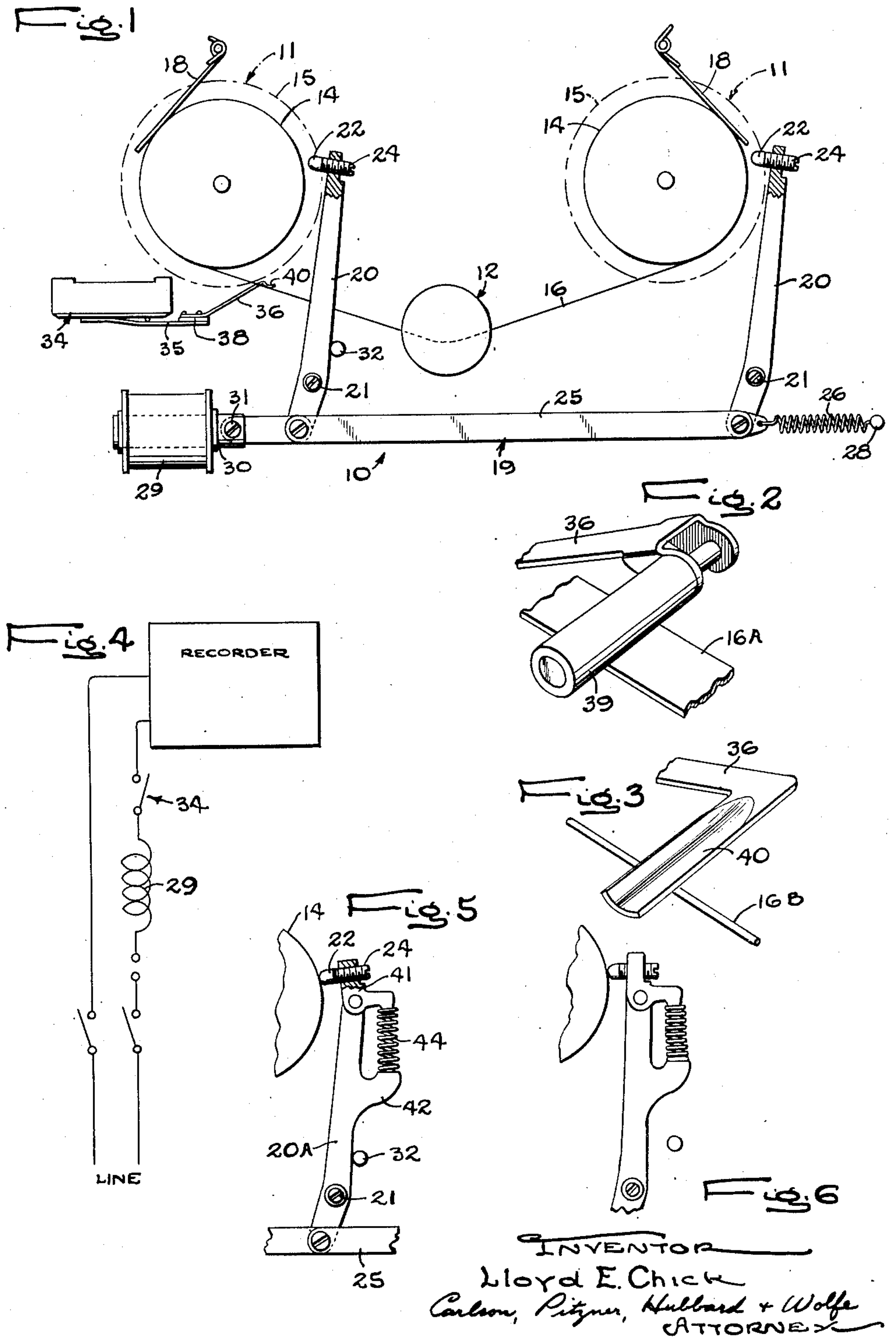
Figure 1 is a plan view of an illustrative device embodying the present invention and applied to a conventional telegraphone or magnetic recorder, certain portions of such device being indicated diagrammatically.
Fig. 2 is an enlarged fragmentary perspective view of one form of control switch arm.
Fig. 3 is an enlarged fragmentary perspective view of another form of control switch arm.
Fig. 4 is a simple diagrammatic view of a circuit which might be used with the illustrative form of the invention disclosed herein.

Fig. 5 discloses a modified form of brake arm, the latter being in one of its operative positions.

Fig. 6 shows the arm of Fig. 5 but in another of its operative positions.

While the invention is susceptible of various modifications and alternative constructions, a preferred embodiment has been shown in the drawings and will be described below in considerable detail. It should be understood, however, that there is no intention to limit the invention to the specific form disclosed, but on the contrary, the intention is to cover all modifications and alternative constructions falling within the spirit and scope of the invention as expressed in the appended claims.

Referring more specifically to Figure 1, the invention is there exemplified in an illustrative protective mechanism 10 adapted for use with a conventional magnetic recorder, the details of the latter being unimportant for present purposes. The recorder is provided with a pair of spaced apart reel members 11 together with a recording head indicated diagrammatically at 12. In the present instance, each of the reel members 11 comprises a rotatable drum 14 and a reel 15 secured to the drum for bodily movement therewith. The reels 15, which are indicated in broken outline in Fig. 1, are adapted to store a flexible recording medium 16 thereon, the latter being in the form of a magnetizable wire or tape. To permit a signal to be impressed upon the recording head from the medium 16, or, conversely, to permit the recording head 12 to impress a magnetic pattern upon the medium 16, the reel members 11 are rotated in synchronism and the medium 16 is led over the head 12. Rotation of the reels may be accomplished through an appropriate drive such as an electric motor and in most instances the drive is of a reversible type. In order to eliminate backlash in the medium 16 as it passes over the recording head 12, each of the reel members 11 may have operatively associated therewith a relatively light friction drag member 18 adapted to bear generally radially upon its drum 14.

Means is provided for arresting the movement of the reel members promptly upon breakage of the recording medium during operation of the recorder or, alternatively, upon failure of the power supply to the machine. This is accomplished in the present instance by the use of a normally disengaged stop brake 19, together with suitable means for engaging the brake upon the occurrence of either of the foregoing conditions. Turning once again to Fig. 1, it will be perceived that the brake 19 includes a pair of substantially identical brake arms 20. Each of the latter is disposed generally tangentially with respect to a corresponding one of the reel members 11 and is pivoted to the frame of the recorder as at 21. Adjacent its outer or free end, each of the arms 20 is equipped with a friction finger, preferably in the form of a rounded tip 22 of rubber or the like bonded to the end of an adjusting screw 24. At their inner ends, the brake arms 20 are pivotally connected to a longitudinally movable brake bar 25 which causes the arms 20 to move in unison. The brake arms 20 are yieldably urged toward their engaged position by resilient means in the form of a biasing spring 26 adapted to exert tension between an anchor post 28 on the frame of the recorder and the right hand end of the brake bar 25 (as viewed in Fig. 1).

Provision is made for releasably holding the brake 19 in a disengaged position against the action of the biasing spring 26, such being accomplished preferably by the use of an appropriate electromagnetic means. In the embodiment of the invention under consideration herein, such means comprises a solenoid 29 having a slidable armature 30 pivotally coupled as at 31 to the end of the brake bar remote from the spring 26. The solenoid 29, when energized, serves to draw the bar 25 to the left in opposition to the tensile force of the spring 26, swinging the brake arms 20 into a position wherein their tips 22 lie well clear of the drums 14. This position may be defined by means of a stationary abutment 32 located in the path of arcuate movement of either of the brake arms. When the solenoid 29 becomes deenergized as, for example, in the event of power failure, the spring 26 immediately takes control and shifts the brake arms 20 from their disengaged position into an engaged position wherein they immediately arrest the rotation of the reel members 11.

For the purpose of actuating the brake releasing solenoid in response to breakage of the recording medium 16, there is provided an appropriate control in the form of a switch 34 which in the present instance is connected in series with both the recorder and the solenoid 29 as indicated in Fig. 4. The switch 34, preferably of the type known in the art as a micro-switch, is equipped with an actuating arm 35 and is inherently biased toward a normally open position. Fixed to the arm 35 is an extension 36 having an upstanding end portion adapted to bear outwardly toward the brake bar against the strand of wire or tape running between the recording head 12 and the reel nearest the switch 34, such bearing action taking place on the reel side of the strand. With this arrangement, the recording medium is subjected to a fair amount of tension during the operation of the machine. Such tension is ample to maintain the switch 34 in its closed position, permitting energization of the solenoid 29 to effect release of the brake and also permitting the recorder to operate. In the event of breakage of the medium 16, the switch operating arm 35 and its extension 36 are permitted to swing clockwise as viewed in Fig. 1, immediately interrupting the power supply to the recorder and to the solenoid, deenergizing both at the same time. When this occurs, the action of the tensile spring 26 once again becomes controlling, resulting in immediate engagement of the brake 19 and stoppage of the reel member 11.

To avoid interference with the normal operation of the recorder, the extension 36 of the switch arm 35 is insulated from the latter as at 38. In addition, the entire extension 36, or at least the upstanding portion thereof which bears against the recording medium 16, is preferably made of non-magnetic material. The upstanding portion of the extension 36 may be fashioned in a number of different ways, depending upon the recording medium with which it is used. Thus, in Fig. 2, there is shown a switch arm 36 having an upstanding portion in the form of a non-magnetic roller 39 which is particularly well adapted for use with recorders using a medium such as tape 16A. In Fig. 3, on the other hand, the upstanding portion of the extension 36 is formed as a non-magnetic, segmentally shaped member 40 which is particularly well suited for use with a medium such as wire 16B.

Turning now to Figs. 5 and 6, there is illustrated a modified form of brake arm 20A which combines the functions of the brake arm 20 and the friction drag 18 shown in Fig. 1. Like the arm 20, the arm 20A is pivoted as at 21 to the frame of the recorder and is shiftable between two alternative positions, being disposed generally tangentially of the drum 14. Pivotally mounted on the free end of the arm 20A is an L-shaped dog 41 which carries an adjustable friction finger similar to that of the arm 20. Intermediate its ends, the arm 20A is formed with a laterally projecting lug 42 which serves as a mounting abutment for one end of a compression spring 44 interposed between such abutment and one arm of the dog 41.

When the brake 19 is in the condition indicated in Fig. 5, each of its arms 20A is held against the stop 32 by the tension of the solenoid upon the brake bar 25. Under such circumstances, the spring 44 is slightly loaded and causes the friction finger to bear against the drum 14 with a force approximately equivalent to that of the friction drag 18 of Fig. 1. This position of the brake and arm 20A may conveniently be termed their drag position. When the brake 19 shifts into the position shown in Fig. 6 as a result of the opening of the control switch 34 and consequent cutting off of power to the recorder, the arm 20A swings counterclockwise away from the stop 32 and subjects the spring 44 to considerable compression. Such action results in the application of sufficient radial force upon the friction finger to stop the drum 14 almost immediately. This position of the brake and the arms 20A may be referred to as their stop position.

In view of the foregoing, it will be appreciated that the protective device disclosed above fulfills the objects set forth earlier herein and contributes materially to foolproof operation in the recorder with which it is used.

I claim as my invention:

1. In a magnetic recorder having a recording head and a pair of reels adapted to store thereon a recording medium, said recorder also having electrically driven drums for rotating said reels and thereby effecting the transfer of said recording medium under tension from one reel to the other, the combination comprising a pivotally mounted brake linkage associated with said drums, said linkage having an engaged position and a disengaged position, a biasing spring adapted to urge said brake linkage toward its engaged position, a solenoid having an armature attached to said brake linkage, said solenoid when energized being adapted to maintain said linkage in its disengaged position in opposition to the force of said spring means, a control switch actuable in response to loss of tension in said recording medium, said switch being interposed in the power supply circuit of said solenoid and said recorder, a swingable actuating arm on said control switch, and a non-magnetic extension rigidly fixed to said actuating arm and disposed so that it bears transversely against said recording medium and substantially parallel to the general plane of said reels when said medium is under tension, said extension being electrically insulated from said actuating arm.

2. In a magnetic recorder having a pair of reels together with a corresponding pair of brake drums and an electrical drive for transferring a flexible recording medium under tension from one to the other of said reels, the combination comprising a pair of brake arms each pivotally mounted adjacent a respective one of said drums and disposed generally tangentially thereto, a dog rockably mounted adjacent one end of each of said brake arms, a friction finger adjustably secured to each said dog, a loading spring interposed between each of said brake arms and its dog for urging its corresponding friction finger into contact with one of said drums, a brake bar disposed in pivotally interconnected relation with said brake arms, said bar and said arms being shiftable in unison between a stop position wherein said friction fingers arrest the motion of said drums and a drag position wherein said friction fingers retard the motion of said drums, a main biasing spring connected to said brake bar and adapted to urge the same and said brake arms toward their stop position, a solenoid coupled to said brake bar and adapted when energized to hold said brake arms in their drag position in opposition to the force of said main biasing spring, a control switch interposed in the power supply circuit of said recorder and said solenoid, and a non-magnetic, electrically insulated actuating member for operating said control switch, said actuating member being disposed in transverse bearing engagement with said recording medium when under tension.

LLOYD E. CHICK.

REFERENCES CITED

The following references are of record in the file of this patent:

UNITED STATES PATENTS

| Number | Name | Date |
|---|---|---|
| 789,336 | Poulsen | May 9, 1905 |
| 814,910 | Kramer | Mar. 13, 1906 |
| 909,414 | Hytten | Jan. 12, 1909 |
| 1,026,118 | Pearson | May 14, 1912 |
| 1,155,776 | Washburn | Oct. 5, 1915 |
| 1,237,496 | Frankhauser | Aug. 21, 1917 |
| 1,767,014 | Rosenberg | June 24, 1930 |
| 1,991,903 | Logan | Feb. 19, 1935 |
| 2,132,024 | Goldberg | Oct. 4, 1938 |
| 2,183,283 | Sampietro | Dec. 12, 1939 |
| 2,306,162 | Gipe | Dec. 22, 1942 |
| 2,519,245 | Greenleaf et al. | Aug. 15, 1950 |
| 2,563,545 | Moreland et al. | Aug. 7, 1951 |

FOREIGN PATENTS

| Number | Country | Date |
|---|---|---|
| 459,035 | Great Britain | Dec. 31, 1936 |